No. 772,559. PATENTED OCT. 18, 1904.
J. C. EDWARDS.
BOBBIN CLUTCHING MEANS FOR ROTATABLE SPINDLES.
APPLICATION FILED JULY 23, 1904.
NO MODEL.
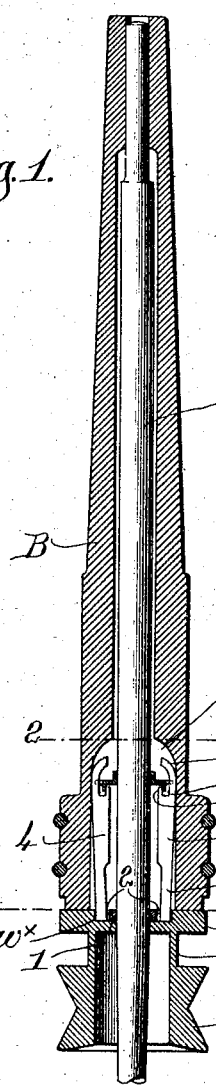
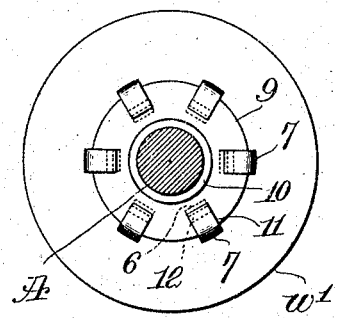
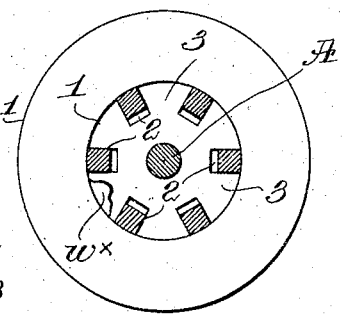
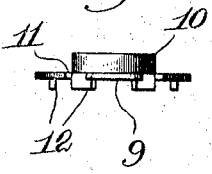
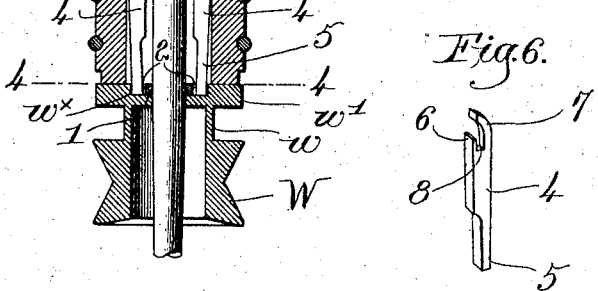
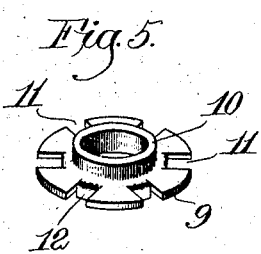
Witnesses.
Thomas J. Drummond.
S. Wm. Lutton.
Inventor.
John C. Edwards,
by Crosby & Gregory
attys.

No. 772,559. Patented October 18, 1904.

UNITED STATES PATENT OFFICE.

JOHN C. EDWARDS, OF BROOKLINE, MASSACHUSETTS, ASSIGNOR TO SAWYER SPINDLE COMPANY, A CORPORATION OF MAINE.

BOBBIN-CLUTCHING MEANS FOR ROTATABLE SPINDLES.

SPECIFICATION forming part of Letters Patent No. 772,559, dated October 18, 1904.

Application filed July 23, 1904. Serial No. 217,838. (No model.)

*To all whom it may concern:*

Be it known that I, JOHN C. EDWARDS, a citizen of the United States, and a resident of Brookline, county of Norfolk, State of Massachusetts, have invented an Improvement in Bobbin-Clutching Means for Rotatable Spindles, of which the following description, in connection with the accompanying drawings, is a specification, like characters on the drawings representing like parts.

This invention relates to means for retaining a yarn-receiver or bobbin upon a rotating spindle such as is employed in spinning, twisting, and other similar machines, and is of the type wherein centrifugally-controlled members firmly engage the bobbin and cause it to rotate with the spindle. A number of bobbin-clutching devices of this general type have been devised and successfully operated varying in their details of construction and arrangement of parts.

My present invention has for one of its objects the production of bobbin-clutching means of the type referred to so constructed and arranged that the various parts, which are not numerous, may be readily stamped, died, or similarly made, thereby decreasing the cost of the device.

Another object of my invention is the production of simple means for limiting the outward or radial movement of the clutch members and for retaining them in position whether the spindle is running free or with a bobbin thereon.

The various novel features of my invention will be fully described in the subjoined specification, and particularly pointed out in the following claims.

Figure 1 is a vertical diametral sectional view of one form of bobbin-clutching means embodying my present invention applied to a rotatable spindle, the yarn-receiver or bobbin being shown in section and held in place upon and to rotate with the spindle. Fig. 2 is an enlarged transverse section on the line 2 2, Fig. 1, looking down, the bobbin being omitted. Fig. 3 is a side elevation of the upper motion-limiting device detached. Fig. 4 is an enlarged transverse section on the line 4 4, Fig. 1, looking down. Fig. 5 is a perspective view of the motion-limiting device shown in Fig. 3, and Fig. 6 is a perspective view of one of the clutch members.

For convenience I have illustrated my invention in connection with a rotatable spinning-spindle A of well-known construction, having an attached whirl W, its upturned sleeve $w$ having a flat circular enlargement or head $w'$, which forms a support or rest for the lower end of the bobbin B during the spinning operation. The spindle-blade extends through the head and is rigidly secured thereto in usual manner, a circular recess $w^\times$ being formed in the top of the head concentric with the spindle-blade. Into this recess is forced a disk-like separator 1, stamped or died out of sheet metal and having a series of radial slots or notches 2 extended part way in from the periphery of the separator, the wall of the recess $w'$ closing the outer ends of the slots, as shown in Fig. 4. The separator is shown in Fig. 1 as about equal in thickness to the depth of the recess $w'$. The lower ends of the bobbin-clutching members, one of which is shown in Fig. 6, are inserted in and are freely movable radially in the slots 2 for a limited distance, as will be obvious from an inspection of Figs. 1 and 4. The intervening portions 3 of the separator serve to laterally position and maintain the lower ends of the clutch members properly spaced. Each of said members is made of a rather thick piece of flat metal, such as brass or iron, and which can be died or punched out and comprises an elongated body portion 4, reduced in radial width at its lower end at 5 to enter one of the slots 2. Preferably the outer upright edge of the clutch member is slightly rounded or convexed transversely, as best shown in Fig. 4. The upper end of the body is shaped to present a straight upturned lip 6 at its inner edge and a curved head 7, which extends above the lip and is curved to slightly overhang the lip, a clearance 8 being presented between the lip and head. The clutching members are symmetrically disposed around the spindle, as shown, the number being optional; but I have illustrated six clutch members herein lying in radial upright planes.

In order to limit the outward radial movement of the clutch members at their upper ends and also to retain them seated in the slots 2 and prevent lifting of the said members, I have provided a motion-limiting or retaining device. (Shown separately in Figs. 3 and 5.) A circular disk 9, of sheet metal, is struck up to present an annular central hub 10, the disk being slitted radially to leave notches 11, the metal between adjacent pairs of slits being bent down, as at 12, to project below the bottom of the disk. The notches 11 are equal in number to the slots 2 in the separator 1 and wide enough to freely receive the upper ends of the clutch members. The hub 10 of the motion-limiting device is forced down upon the spindle until the lips 6 will just pass under the depending stops 12, and the lower ends 5 of the clutch members having been inserted in the slots 2 the upper ends of said members are pushed in toward the spindle. The retaining device is then moved down into permanent position, (shown in Fig. 1,) the stops 12 entering the clearances 8 between the lips 6 and the overhanging heads 7. Any suitable means may be employed to rigidly connect the hub 10 with the spindle, either by a driving fit, by pinning, or by brazing, as may be found most convenient.

The clearances 8 are wide enough to permit the upper ends of the clutch members to move inward far enough to readily enter the chamber $b$ in the base of the bobbin and to permit the clutch members to be thrown outward into firm driving engagement with the bobbin by the action of centrifugal force when the spindle is rotated. Preferably the clutch members are permitted to have a greater outward movement at their upper ends to bear hardest on the bobbin near the upper end of the chamber, thereby preventing any lifting of the bobbin from its rest $w'$. Bodily rotation of the clutch members with the spindle is insured by the pressure of the sides of the slots 2 and 11 against the sides of the said members at their upper and lower ends. The longitudinal curvature of the outer edges of the heads 7 serves to permit the bobbin to be easily slid down over the clutch members when the bobbin is placed upon the spindle and obviates any necessity for other guiding means.

From the foregoing description, taken in connection with the drawings, it will be seen that the various members of the clutch device can be struck up or similarly shaped from flat metal with great ease and rapidity at small expense, no machining being required other than a slight grinding or shaping of the outer faces of the clutch members, if desired, to give them a somewhat rounded or convexed shape transversely.

Any tendency of the clutch members to lift is prevented by the depending stops, which engage the bottoms of the clearances between the upturned lips and the heads of said members.

The slotted separator 1, in connection with the recessed head $w'$, constitutes a radially-recessed raceway for and in which the lower ends of the clutch members are loosely held and supported vertically.

Having fully described my invention, what I claim as new, and desire to secure by Letters Patent, is—

1. The combination with a rotatable spindle provided with a radially-recessed raceway, of flat bobbin-clutching members having their lower ends loosely held therein and disposed in upright radial planes around the spindle, each member having its upper end shaped to present an upturned lip at its inner edge and a head at its outer edge extended above the lip, and means fixedly mounted on the spindle to enter loosely the clearance between the lip and head of each member and limit radial and lifting movement thereof.

2. The combination with a rotatable spindle provided with a radially-recessed raceway, of bobbin-clutching members having their lower ends loosely held therein, each member having at its upper end an upturned inner lip and an external curved head projecting above and partly overhanging the lip, and means fixedly mounted on the spindle to coöperate loosely with said members between their heads and lips and limit radial movement thereof, said means having peripheral portions interposed between the members to separate the same and insure their bodily rotation with the spindle.

3. The combination with a rotatable spindle provided with an annularly-recessed bobbin-rest and a radially-slotted separator seated in the recess, of elongated, flat bobbin-clutching members having their lower ends loosely held in said slots each member having an upturned, interior lip at its upper end, a motion-limiting device fixedly secured to the spindle and radially slotted to loosely receive the upper ends of said members, and depending stops on said device to project in front of said lips and limit radial movement of the clutching members.

4. The combination with a rotatable spindle provided with a radially-recessed raceway and bobbin-rest, of elongated bobbin-clutching members having their lower ends loosely held in said raceway, each of said members having an upturned and inwardly-curved head and an interior, upturned lip separated from the head, and a radially-slotted disk mounted on the spindle adjacent the upper ends of said members and having depending stops at the inner ends of the slots, the latter loosely receiving the heads and the stops projecting into the clearances between the lips and heads of the clutching members, whereby the latter are laterally positioned and permitted limited radial movement.

5. A rotatable spindle having a rigidly-attached whirl and an annularly-recessed bobbin-rest, and a flat, radially-slotted separator concentric with the spindle and inserted in the recess, combined with a series of flat, elongated and centrifugally-acting clutch members arranged symmetrically around the spindle and having their lower ends loosely held in the slots of the separator, each of said members having an upturned, interior lip and an outer head projecting above the lip, a motion-limiting disk fixedly mounted on the spindle and having radial slots to receive the heads, and depending stops integral with said disk to project in front of the lips, to limit radial movement and prevent lifting of the clutch members.

6. The combination with a spinning-spindle provided with a bobbin-rest and a radially-recessed raceway, and a circular, radially-slotted disk secured to the spindle above it and having depending stops at the inner ends of the slots, of centrifugally-acting bobbin-clutching members loosely held in and vertically supported by said raceway and having upturned lips at their upper ends, to project behind the stops and limit outward movement of said members at their upper ends, the portions of the clutching members outside the upturned lips being seated loosely in the slots of the disk.

In testimony whereof I have signed my name to this specification in the presence of two subscribing witnesses.

JOHN C. EDWARDS.

Witnesses:
ELIZABETH R. MORRISON,
NATHAN HEARD.